Figure 6:
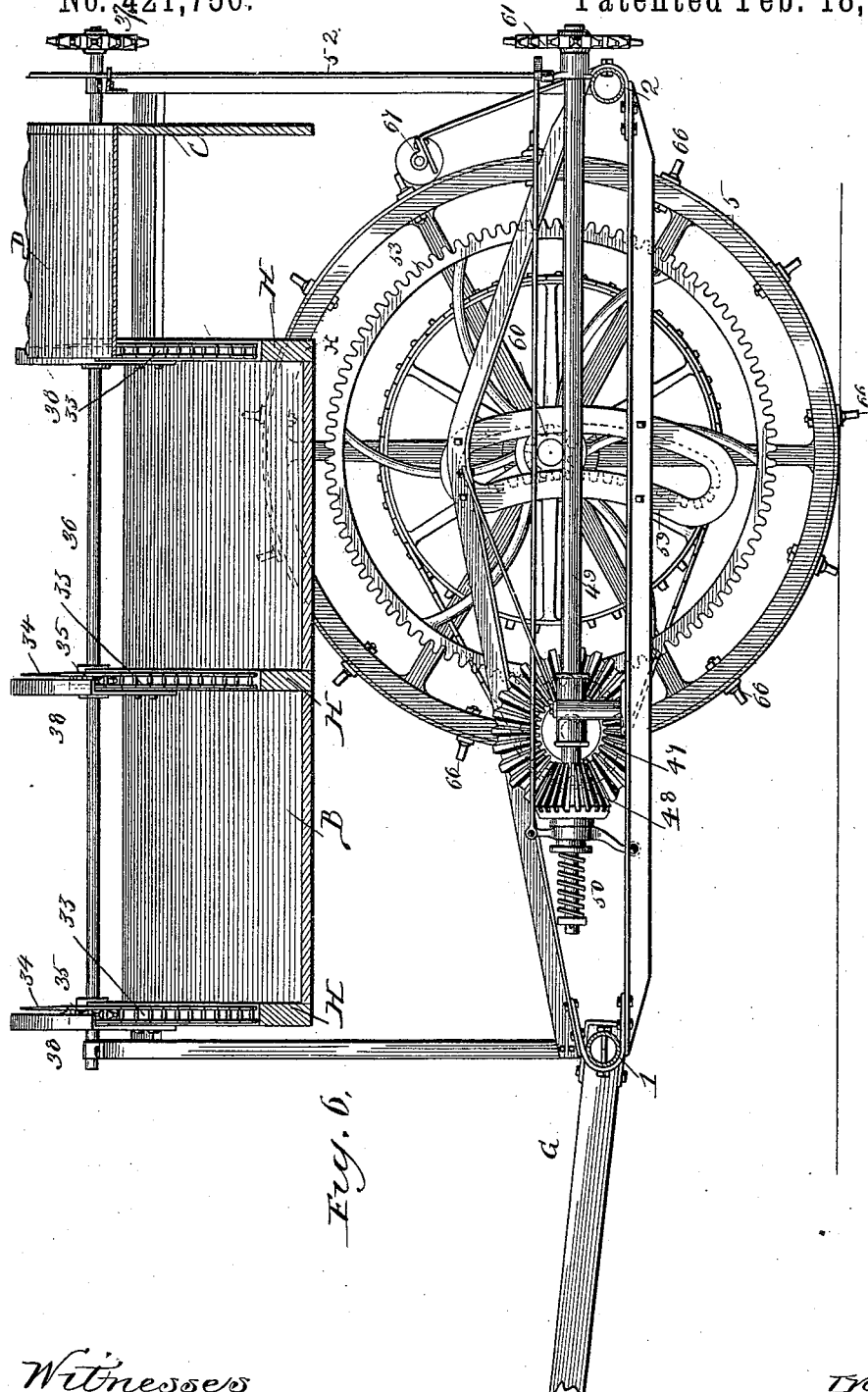

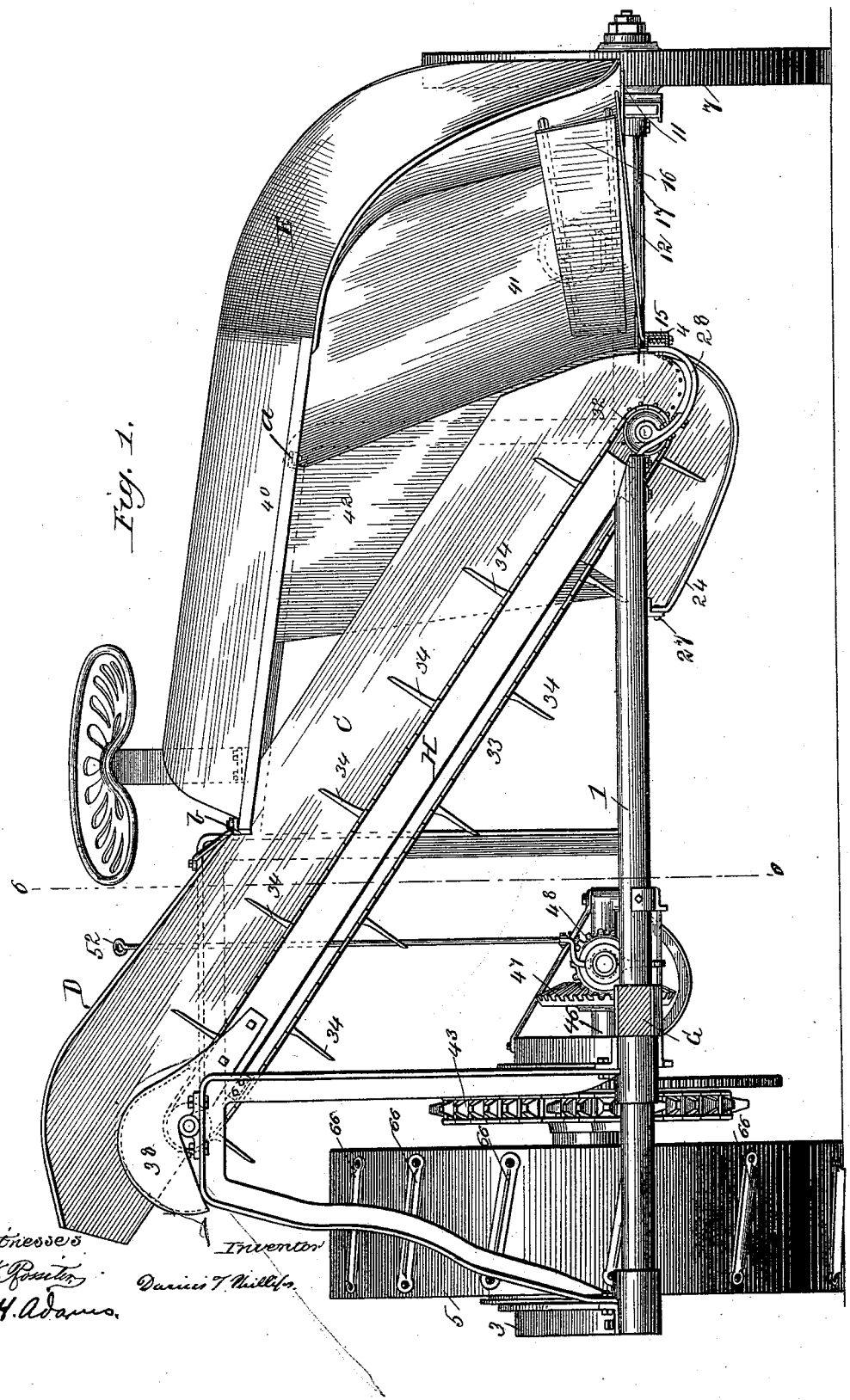

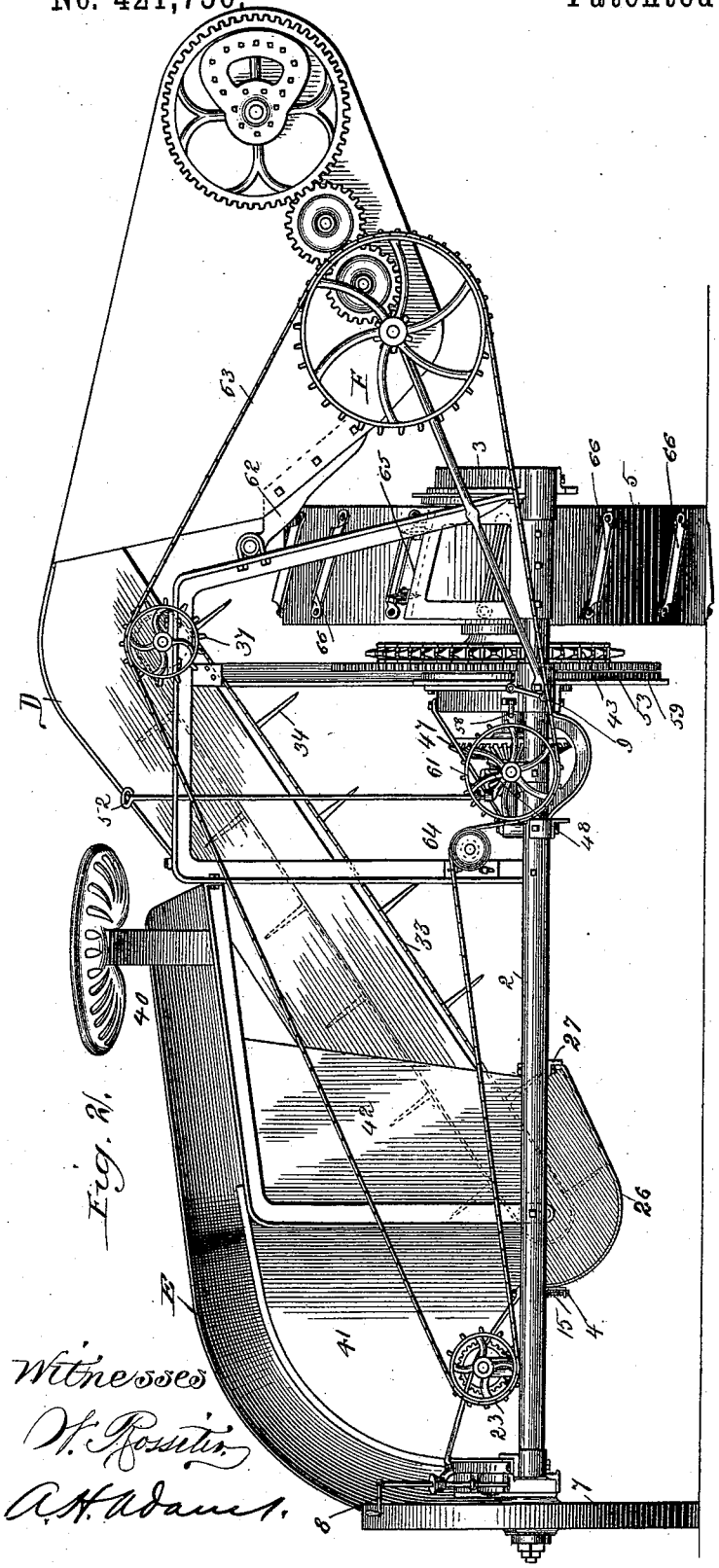

(No Model.) 5 Sheets—Sheet 3.
D. T. PHILLIPS.
CORN HARVESTER.
No. 421,756. Patented Feb. 18, 1890.
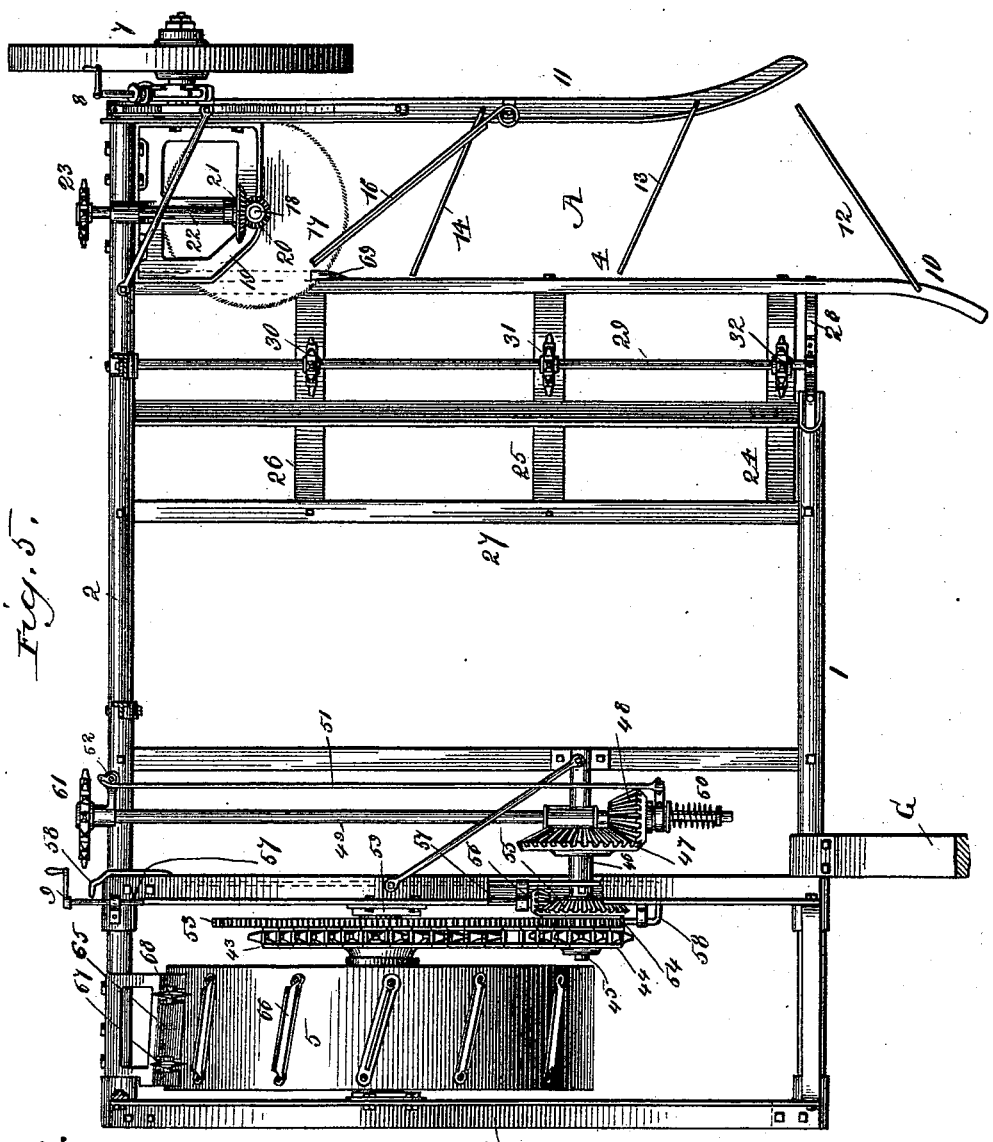

(No Model.) 5 Sheets—Sheet 4.
D. T. PHILLIPS.
CORN HARVESTER.

No. 421,756. Patented Feb. 18, 1890.

Witnesses
W. Rossiter
A. H. Adams

Inventor
Darius T. Phillips (No Model.) 5 Sheets—Sheet 5.
D. T. PHILLIPS.
CORN HARVESTER.
No. 421,756. Patented Feb. 18, 1890.
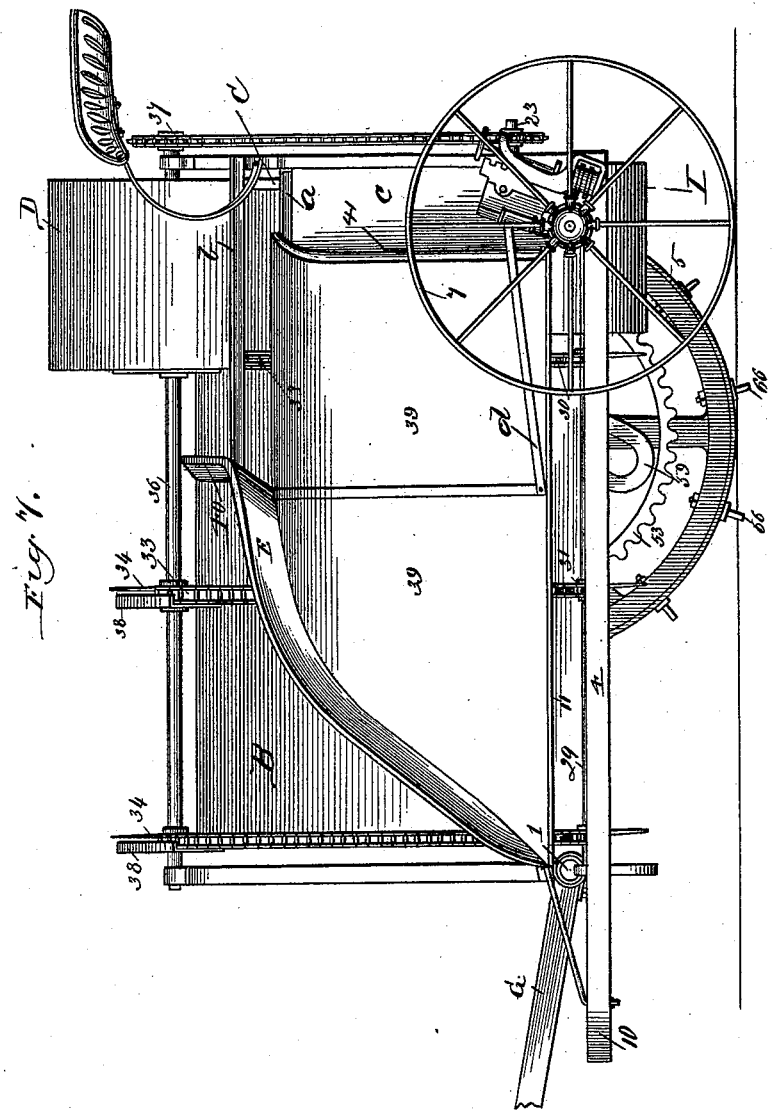
Witnesses
W. Rossiter
Albert H. Adams
Inventor
Darius T. Phillips

UNITED STATES PATENT OFFICE.

DARIUS T. PHILLIPS, OF CHICAGO, ILLINOIS, ASSIGNOR OF ONE-HALF TO DAVID W. MITCHELL, OF SAME PLACE.

CORN-HARVESTER.

SPECIFICATION forming part of Letters Patent No. 421,756, dated February 18, 1890.

Application filed November 30, 1888. Serial No. 292,269. (No model.)

*To all whom it may concern:*

Be it known that I, DARIUS T. PHILLIPS, residing at Chicago, in the county of Cook and State of Illinois, and a citizen of the United States, have invented a new and useful Improvement in Corn-Harvesters, of which the following is a specification, reference being had to the accompanying drawings, in which—

Figure 1 is a front elevation. Fig. 2 is a rear view. Fig. 3 is a detail, being an elevation of the wheel-scraper. Fig. 4 is a side elevation of the scraper. Fig. 5 is a plan, the hood and carrier being removed. Fig. 6 is a section at line 6 of Fig. 1, looking to the left. Fig. 7 is an elevation from the grainward side of the machine.

The object of my invention is to provide a machine by the use of which standing corn can be readily cut and bound into bundles for shocking; and it consists, mainly, in providing a rotating cutter at the rear of the machine, in combination with guards with an open space between them extending from the front to the cutter and two or more springs or spring-rods arranged across the open space to raise broken stalks of corn from the ground and prevent the stalks from falling to the ground after being cut, in providing a curved or inclined hood arranged to cause the corn to be thrown forward and to one side on the carrying-chains, and in a carrier to elevate the corn over the drive-wheel, in combination with caps over the endless chains of the carrier.

Those things which I claim as new will be pointed out in the claims.

In the drawings, 1 2 3 4 represent the principal parts of the main frame.

5 is one of the wheels which supports the machine and serves also the purpose of a driving-wheel, as is usual in similar machines.

7 is the other supporting-wheel, which is connected with the frame, as is common with machines of this class and with harvesting-machines. The main frame can be raised and lowered by rotating the cranks 8 9, which operate devices which are in common use for this purpose, and to which I make no claim either separately or in combination. The piece 4 of the frame forms the inside guard and is extended forward a little and curved outward, as shown at 10.

11 is the outside guard, which is secured to the main frame. Between the two pieces 4 and 11 there is an open space A, which receives the standing corn as the machine passes over the ground.

12 13 14 are rods placed across the open space A at an angle. The rod 12 is hinged to the piece 4, and the rods 13 14 are hinged to the piece 11. Connected with the hinged end of each of these rods is a spring 15, Fig. 1, which has a tendency to hold the rods in the position shown in Fig. 5, but allows them to be forced backward by the cornstalks.

16 is a fender hinged to the guard 11. Near the hinged end it is provided with a coil that serves the office of a spring, the tendency of which is to hold the fender in the position shown in Fig. 5.

17 is a circular cutter secured to a short shaft 18, which passes through the casting 19, which is secured to the frame. On the upper end of the shaft 18 there is a beveled wheel 20, which rests on the top of the casting 19, and is driven by the beveled wheel 21 on the shaft 22, on which is a sprocket-wheel 23.

24 25 26 are curved bars connected with the bars 4 and 27.

28 is a curved iron connected with the parts 1 and 4 of the frame.

29 is a shaft on which there are three sprocket-wheels 30 31 32.

33 are endless chains provided with teeth or prongs 34. (See Fig. 1.) These endless chains 33 run over the sprocket-wheels 30 31 32, and over similar sprocket-wheels 35 on the shaft 36, which runs in suitable bearings in supports upon the main frame. (See Fig. 6.) The chains run over inclined bars H, (shown in Figs. 1 and 6,) which prevent the chains from sagging under the weight of the corn.

37 is a sprocket-wheel on the shaft 36.

38 are guards over the sprocket-wheels 35.

B is an inclined platform.

C is a board secured to cross-bars, to which the platform is secured.

D is a guard or cover secured to the board C at the upper end and extending forward to the rear of the platform, as shown in Fig. 6.

The machine is provided with a gathering-hood, one part of which consists of a curved plate 39, which covers most of the grain side of the machine, and its upper edge is supported by the bar *a*. This part 39 is supported by a frame, of which the bar *a* is a part, but does not extend over the whole of the top of such frame, but there is an open space between the upper edge of the part 39 and the bar *b*, which is also a part of this frame, which frame may be regarded as a part of the hood. On the front edge of the hood there is a flange E, and this flange extends over the whole of the front of the frame of the hood. A part of this flange extends along the front edge of the part 39, as shown in Fig. 7, and the remaining part of the flange, which is indicated by 40, extends laterally along the front edge of the frame of the hood. The hood is secured to the main frame and to the guard 11, and part of its rear is closed by a plate 41. The part *c* is a continuation of this plate 41. The special object of the flange E is to prevent the ears of corn from being caught by the front edge of the hood proper. The front edge of the side of the hood is, as shown, inclined, and this portion of the hood extends forward considerably farther than that part which is directly over the machine.

42 is another plate at the rear of the machine, connected with and located at nearly a right angle with plate 41.

43 is a sprocket-wheel on the shaft or axle on which the driving-wheel 5 is supported.

44 is a sprocket-wheel on the shaft 45 in a sleeve 46, which shaft carries a wheel 47, which engages with a beveled wheel 48, which can slide upon the shaft 49, and is held in engagement with the wheel 47 by the spring 50, but can be disengaged therefrom through the rods 51 52 and other suitable common devices.

53 is a gear-wheel loosely mounted on the axle, which carries the wheel 5, which wheel 53 engages with the wheel 54, which is loose on the shaft 45 and is connected with the beveled wheel 55, which is loose on the shaft 45.

56 is a beveled wheel on the rod 57, which wheel engages with the wheel 55. The rod 57 carries the operating-crank 9.

58 is a locking device to engage with the wheel 54.

59 (see Fig. 6) is a gear-bracket, with which the pinion 60 engages, the latter being rigid with wheel 53. The wheels 53, 54, 55, and 56, gear-bracket 59, and pinion 60 are to be used in raising and lowering one end of the main frame, which can be done by rotating the crank 9, the lock 58 being disengaged from the wheel 54.

61 is a sprocket-wheel on the shaft 49.

The devices which I use for binding the corn are similar to those used in self-binding harvesters. I have not shown the binding devices in full. The wheel F is a sprocket-wheel, by which the binding devices are driven. These devices are connected with the machine by means of brackets 62 and other common devices.

63 is the driving-chain, which passes over the sprocket-wheels 23, 37, F, and 61.

64 is an idler.

65 is a scraper or cleaner, one end of which is secured to the main frame by bolts. The other end rests against the wheel 5, which, as shown, is provided with clips 66.

67 68 are two wheels connected with the scraper or cleaner to cause it to ride over the clips. The scraper, being made of spring-steel, can be so arranged as to be held against the face of the wheel 5, or near to it, except when it rides over the clips. The wheels 67 68 are beveled. Their edges are sharp, so that they will cut through the dirt on the wheel 5, and their edges extend a little below the edge of the scraper.

69 (see Fig. 5) is a guard for the cutter 17. It is similar to a sickle-guard and prevents clogging. This guard is supported by the casting 19.

G is a tongue.

*d* (see Fig. 7) is a brace to steady the top of the devices which raise and lower the wheel 7.

I is a piece of curved sheet metal secured to the under side of the curved bar 26, and also at the back of the main frame, to prevent the butts of the stalks from falling to the ground when cut. The two parallel lines curving to the rear at their upper ends at the rear of wall 39, Fig. 7, represent a strengthening rod or rib.

The entire front of the machine is open, which construction allows stops of any length to be received by the carrier and carried out and delivered to the binder and from it to the ground without obstruction.

In use the operation is as follows: The machine is to be driven in the field so that the guards 4 and 11 will pass one on each side of the corn to be cut. The springs 12 13 14 will one after the other come in contact with the stalks of corn, and if bent over they will be raised from the ground and straightened up, and when the fender 16 comes in contact with the corn such fender will be forced back a little and the corn will be forced over toward the bar 4, and, coming in contact with the cutter 17, the stalks will be cut; but just before being cut they will be bent forward and toward the conveyer by coming in contact with the curved and inclined hood, and when cut will fall into the open space at the bottom of the carrier and will be caught at once by the teeth or prongs 34, and will be carried up over the drive-wheel and deposited in proper position to be bound by the self-binding apparatus. The corn will pass over the guards 38 and be carried up over the sprocket-wheels 35 without coming in contact therewith. The butts of the stalks will pass under the guard D, which will prevent them from being carried too far up by the movement of the prongs 34, and will cause the stalks to be properly delivered to the binder.

The action of the spring-fender has a tendency to force the stalks after they have been cut over toward the elevating devices.

An important feature of my invention is the hood, which causes the cornstalks to be inclined forward and to one side as they come in contact with the front edge of the hood, which is the part which acts on the stalks.

Another important feature of my invention is the construction of the plates 41 and 42 at the rear of the hood, said plates being so located that stalks that are bent forward too low to come in contact with the front edge of the hood strike in the pocket formed by the junction of these plates, and are either bowed and snap out as the machine moves forward or are broken off short and seized by the carrier.

What I claim as new, and desire to secure by Letters Patent, is as follows:

1. In a corn-harvester, a hood extending over a portion of that part of the machine which receives the cornstalks, having its front edge inclined upward, rearward, and laterally for the purpose of bending the cornstalks forward and to one side and closed at its rear end, substantially as specified.

2. In a corn-harvester, a main frame and a cutter located at the rear of the machine, in combination with two guards 4 and 11, two or more spring-rods, which extend across the space between the guards, and a fender 16, extending diagonally across the space between the guards and in front of the cutter, substantially as and for the purposes specified.

3. In a corn-harvester, the combination, with a hood extending over the receiving end of the machine and closed at its rear end and a cutter beneath said hood, of spring-rods covering the space in front of the cutter and beneath the hood and adapted, in conjunction with the closed hood, to receive the cut stalks and deliver them to the carrier, substantially as described.

4. In a corn-harvester, the combination of a main frame, a cutter located at the rear of the machine, two guards 4 and 11, a hood extending over a portion of that part of the machine which receives the cornstalks and having its forward edge inclined upward, rearward, and laterally, a carrier consisting of endless chains provided with teeth or prongs to carry the cut cornstalks over the sprocket-wheel at the upper end of the carrier, and a guard D, located at the upper end and in rear of the carrier, substantially as and for the purposes specified.

5. A corn-harvester the entire front of which is open, provided with a hood closed at its rear end and having its front edge inclined upward, rearward, and laterally, a cutter, and a carrier at right angles to the front of the hood, adapted to receive the stalks and elevate them with their tops lying toward the open end, substantially as described.

DARIUS T. PHILLIPS.

Witnesses:
HARRY T. JONES,
A. H. ADAMS.